US009197311B2

(12) United States Patent
Zhang et al.

(10) Patent No.: US 9,197,311 B2
(45) Date of Patent: Nov. 24, 2015

(54) SELF-ADAPTED MULTI-ANTENNA SELECTION METHOD FOR BROADBAND WIRELESS ACCESS FOR HIGH-SPEED RAILWAY

(75) Inventors: Jiayi Zhang, Beijing (CN); Haibo Wang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 148 days.

(21) Appl. No.: 14/124,094

(22) PCT Filed: Aug. 9, 2012

(86) PCT No.: PCT/CN2012/079868
§ 371 (c)(1),
(2), (4) Date: Dec. 5, 2013

(87) PCT Pub. No.: WO2014/022999
PCT Pub. Date: Feb. 13, 2014

(65) Prior Publication Data
US 2015/0180563 A1    Jun. 25, 2015

(51) Int. Cl.
*H04Q 7/00* (2006.01)
*H04B 7/08* (2006.01)
*H04L 29/08* (2006.01)
*H04W 88/06* (2009.01)

(52) U.S. Cl.
CPC .............. *H04B 7/082* (2013.01); *H04B 7/0834* (2013.01); *H04L 67/12* (2013.01); *H04W 88/06* (2013.01); *Y02B 60/50* (2013.01)

(58) Field of Classification Search
None
See application file for complete search history.

(56) References Cited

U.S. PATENT DOCUMENTS

| 2003/0076891 | A1  | 4/2003 | Won |
| 2005/0208924 | A1* | 9/2005 | Ohaku et al. ................. 455/345 |
| 2007/0082672 | A1* | 4/2007 | Fujioka et al. ............... 455/436 |
| 2013/0163484 | A1* | 6/2013 | Ihm et al. ..................... 370/280 |

FOREIGN PATENT DOCUMENTS

| CN | 101453739 A | 6/2009 |
| CN | 101515669 A | 8/2009 |
| CN | 101631379 A | 1/2010 |
| JP | 2006094423 A | 4/2006 |
| JP | 2010028527 A | 2/2010 |

OTHER PUBLICATIONS

Sarris, I and Nix, A.R., "Design and Performance Assessment of High-Capacity MIMO Architectures in the Presence of a Line-of-Sight Component," IEEE Transactions on Vehicular Technology, vol. 56, No. 4, Jul. 2007, pp. 2194-2202.

(Continued)

*Primary Examiner* — Duc C Ho
(74) *Attorney, Agent, or Firm* — Brundidge & Stanger, P.C.

(57) ABSTRACT

Various embodiments of a self-adapted multi-antenna selection technique based on broadband wireless access network for high-speed railway are provided. Compared with conventional techniques, the proposed strategy adaptively pairs antennas of an antenna array associated with a base station in response to the fast-changing distance between the base station and the antenna array on a high-speed train. The proposed technique achieves a channel matrix with full rank and thereby improves the channel capacity. This Abstract is submitted with the understanding that it will not be used to interpret or limit the scope or meaning of the claims.

22 Claims, 7 Drawing Sheets

(56) References Cited

OTHER PUBLICATIONS

Zaggoulos, G. et al., "Novel Antenna Configurations for Wireless Broadband Vehicular Communications," Sixth International Conference on Wireless and Mobile Communications, 2010, pp. 21-26.

Matthaiou, M. et al., "Capacity Study of Vehicle-to-Roadside MIMO Channels with a Line-of-Sight Component," IEEE Wireless Communications and Networking Conference, Mar. 31-Apr. 3, 2008, pp. 775-779.

Kang, M. and Alouini, M.-S., "Capacity of MIMO Rician channels," IEEE Transanctions on Wireless Communications, vol. 5, Issue 1, Jan. 2006, pp. 112-122.

Grant, A., "Rayleigh Fading Multi-Antenna Channels," EURASIP Journal on Applied Signal Processing, vol. 2002, No. 3, Received on May 29, 2001, pp. 316-329.

International Search Report and Written Opinion for International Patent Application No. PCT/CN2012/079868 mailed May 9, 2013.

* cited by examiner

SELF-ADAPTED MULTI-ANTENNA SELECTION METHOD FOR BROADBAND WIRELESS ACCESS FOR HIGH-SPEED RAILWAY

CROSS-REFERENCE TO RELATED APPLICATIONS

This Application is the National Stage filing under 35 U.S.C. §371 of PCT Application Ser. No. PCT/CN12/79868 filed on Aug. 9, 2012.

BACKGROUND

With the rapid development and deployment of high-speed railway around the world, it has become imperative for service providers to provide broadband wireless access services for passengers on a train moving at high speed. During a journey up to several hours, the passengers may desire various communication services including voice, email, web browsing, multimedia services, etc. In a typical scenario, a data transmission rate of at least 100 Mbps-1 Gbps would be required in order to provide broadband wireless access to 500-1,000 passengers who require such services on a single high-speed train. This would be challenging for the train's wireless communication system as it is required to support the high-speed movement and the high data rate simultaneously. Further, given the scarcity of spectrum resources, whichever technical standard is adopted for train-track link needs to achieve very high spectrum efficiency to meet the requirement of high transmission rate.

Multiple-input and multiple-output (MIMO) is one of the main technical solutions that improve spectrum efficiency and transmission reliability in current public cellular networks. In general, MIMO multi-stream transmission mode is applicable in cities with strong multi-path transmission effect, especially in an indoor environment, to improve spectrum efficiency because the MIMO channel matrix under such condition is likely to achieve the full rank state. However, in suburbs and in the countryside, the gain of the MIMO spectrum efficiency may be reduced due to the presence of a direct, line-of-sight path between a transmitter and a receiver. This is because the greater correlation between the signals received from different transmission paths causes the rank loss of the MIMO channel matrix and reduces the channel capacity.

There exist techniques that keep the orthogonality between the space sub-channels by optimizing a distance between the MIMO antennas; however, the optimization is achieved based on a certain specific distance between the transmitting antennas and the receiving antennas and an environment with a very high signal-to-noise ratio (SNR) such as 20 dB. Such techniques thus are not suitable for high-speed railway wireless communications because the location of the high-speed train changes rapidly and because of the distance between the transmitting antennas and the receiving antennas and a low SNR.

Moreover, existing techniques utilize a single antenna or a pair of antennas with half-wavelength interval at each trackside base station to provide signal coverage for user devices of users carried by a high-speed train.

SUMMARY

By at least one embodiment, a method includes estimating an approximate distance between a base station and a set of antennas on a moving platform that travels through an area within a wireless communication range of the base station, adaptively selecting a pair of antennas from a plurality of antennas associated with the base station based at the estimated approximate distance between the base station and the set of antennas on the moving platform, and utilizing the selected pair of antennas in wireless communication with the set of antennas on the moving platform.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
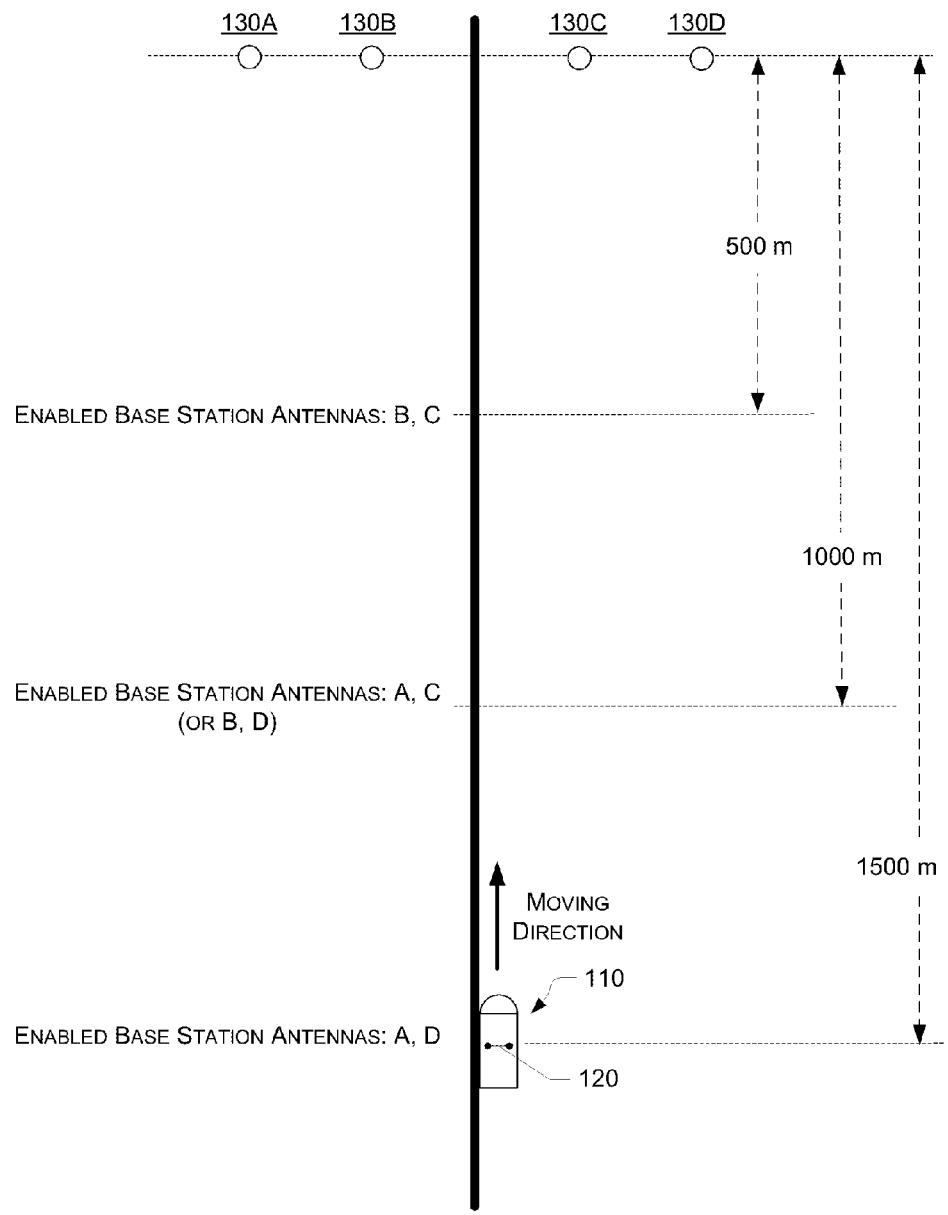
FIG. 1 shows an example scheme of self-adapted multi-antenna selection for broadband wireless access for high-speed railway, arranged in accordance with embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are systems, apparatuses, computer program products, methods, and techniques related to self-adapted multi-antenna selection for broadband wireless access for high-speed railway. The implementations of self-adapted multi-antenna selection described herein include monitoring an approximate distance between a base station and a set of antennas on a moving platform that travels through an area within a wireless communication range of the base station. Respective pairs of antennas a plurality of antennas associated with the base station are enabled for wireless communication with the moving platform corresponding to respective approximate distances between the base station and the set of antennas on the moving platform. More specifically, a first pair of antennas of the plurality of antennas associated with the base station is utilized for wireless communication with the set of antennas on the moving platform when the approximate distance between the base station and the set of antennas on the moving platform is estimated to be a first distance. When the approximate distance between the base station and the set of antennas on the moving platform is estimated to be a second distance less than the first distance, a second pair of antennas of the plurality of antennas associated with the base station are utilized for wireless communication with the set of antennas on the moving platform. Separation between the two antennas of the first pair of antennas is greater than separation between the two antennas of the second pair of antennas.

Overview

Figure 2A:
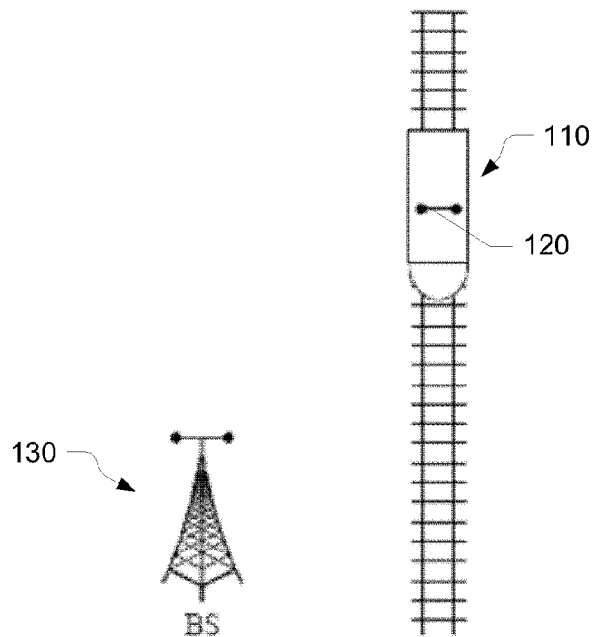
FIG. 2 shows a spatial relationship between a base station and a moving platform, arranged in accordance with embodiments described herein.
Figure 2B:
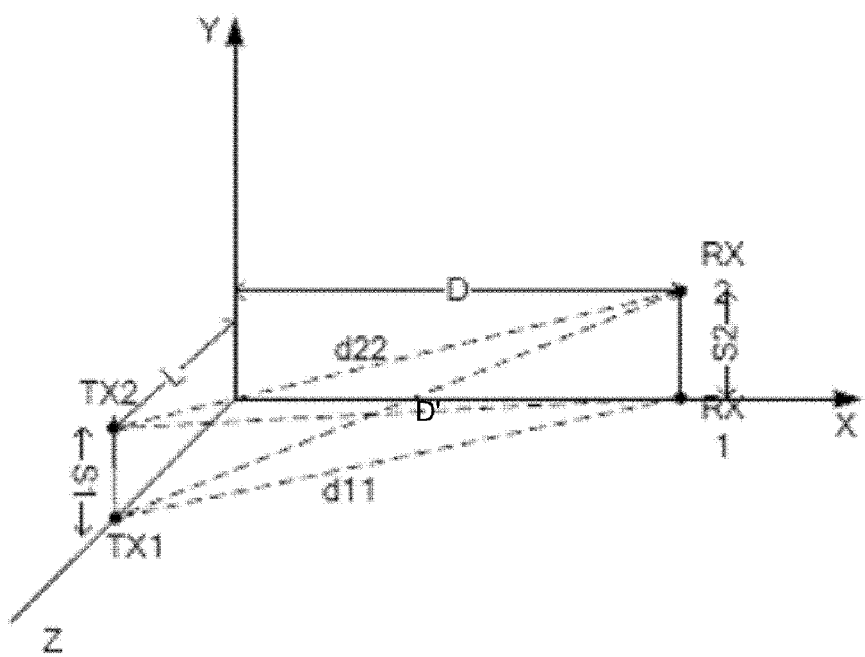

FIG. 1 shows an example scheme 100 of self-adapted multi-antenna selection for broadband wireless access for high-speed railway, arranged in accordance with embodiments described herein; and FIGS. 2A and 2B show a spatial relationship between a base station and a moving platform, arranged in accordance with embodiments described herein.

Referring to FIG. 1, FIG. 2A and FIG. 2B, under scheme 100, each of a base station 130 (e.g., a trackside base station) and a moving platform 110 (e.g., a high-speed train) is equipped with a plurality of antennas. As shown in FIG. 1 and FIG. 2A, the base station 130 includes an array of a plurality of antennas 130a, 130b, 130c and 130d, and the moving platform 110 includes a set of antennas 120 (e.g., two antennas). More specifically, the set of antennas 120, aligned in a direction perpendicular to a direction in which the moving platform 110 is moving, is disposed on top of the moving platform 110. The plurality of antennas 130a, 130b, 130c and 130d, aligned in approximately the same direction as the direction in which the set of antennas 120 are aligned, is associated with the trackside base station 130 and is disposed on both lateral sides of the railway track.

FIG. 2B shows a three-dimensional model of a spatial relationship between the base station 130 and the moving platform 110. Herein, D denotes a horizontal distance between the moving platform 110 and the base station 130; L denotes a height difference between the plurality of antennas 130a, 130b, 130c and 130d and the set of antennas 120 on the moving platform 110; S1 denotes a respective separation between a selected pair of antennas of the plurality of antennas 130a, 130b, 130c and 130d; and S2 denotes a separation between two antennas of the set of antennas 120 on the moving platform 110. As a non-limiting example, when the value of L is relatively small and insignificant with respect to the value of D, a direct line distance between the set of antennas 120 and the plurality of antennas 130a, 130b, 130c and 130d is approximately the same as D and is assumed as such in the following description and calculations. In this model, the input-output relationship of multiple baseband discrete signals can be expressed as equation (1) as follows:

$$y = Hx + n \tag{1}$$

In equation (1), x denotes a transmitting signal vector; y denotes a receiving signal vector with noise; n denotes an additive white Gaussian noise with a circular normal distribution; and H denotes a transmission matrix for MIMO channel. For a system with ideal channel information on the receiver side and without the channel information on the transmitter side, channel capacity (or spectrum efficiency) per unit bandwidth can be expressed as equation (2) as follows:

$$C = \log_2\left(\det\left(I_{n_r} + \frac{SNR}{n_t} HH^*\right)\right) \tag{2}$$

In equation (2), $I_{n_r}$ denotes an identity matrix of $n_r \times n_r$ whereby $n_t$ and $n_r$ represent the number of transmitting antennas and the number of receiving antennas, respectively; SNR denotes an average signal-to-noise ratio from the perspective of the receiving antennas; and $(\bullet)^*$ denotes a conjugate transpose form of the matrix.

Suppose that the channel obeys the Rician Channel Model, H can be divided into two portions when a direct (line-of-sight) path exists, namely: a deterministic free-space propagation component $H_L$ and a random scattering component (a multi-path propagation component) $H_S$, expressed as equation (3) as follows:

$$H = \sqrt{\frac{K}{K+1}} H_L + \sqrt{\frac{1}{K+1}} H_S \tag{3}$$

In equation (3), K denotes a power ratio of the direct path to the scattering path. Channel response between the $m_{th}$ transmitting antenna and the $n_{th}$ receiving antenna in the matrix $H_L$ can be expressed as $$e^{-jkd_{n,m}/d_{n,m}}.$$

Here, k is a wave number corresponding to carrier wavelength λ, m and n representing a serial number of transmitting antennas and a serial number of receiving antennas, respectively, and $d_{n,m}$ denotes a distance between the antenna units m and n.

When a difference of electromagnetic wave travel energy loss caused by the difference $d_{n,m}$ between the transmitting antennas and the receiving antennas is small enough to be ignored, the normalized matrix $H_L$ can be expressed as equation (4) as follows:

$$H_L = \begin{bmatrix} e^{-j2\pi d_{11}/\lambda_c} & e^{-j2\pi d_{12}/\lambda_c} & \cdots & e^{-j2\pi d_{1n_t}/\lambda_c} \\ e^{-j2\pi d_{21}/\lambda_c} & \ddots & & \vdots \\ \vdots & & \ddots & \vdots \\ e^{-j2\pi d_{n_r 1}/\lambda_c} & \cdots & & e^{-j2\pi d_{n_r n_t}/\lambda_c} \end{bmatrix} \tag{4}$$

According to equation (2), the channel capacity reaches a maximum when $H_L H_L^*$ is of full rank. Based on this optimal condition and equation (4), the separation between the antennas satisfies an equation (5) as follows:

$$s_1 s_2 = (2z + 1)\frac{\lambda_c D}{2} \quad (5)$$

In equation (5), z denotes a non-negative integer. It can be seen from equation (5) that the maximization of channel capacity can be achieved when the separation between the selected pair of antennas changes corresponding to a change of the distance D between the set of antennas 120 on the moving platform 110 and the base station 130 (e.g., the plurality of antennas 130a, 130b, 130c and 130d associated with the base station 130). On the other hand, the number of antennas equipped on the moving platform 110 and the number of the plurality of antennas 130a, 130b, 130c and 130d associated with the base station 130 may be limited in consideration of cost and other factors such as real property. Thus, a suitable number of antennas may be chosen according to the distance between the antennas 130a, 130b, 130c and 130d of the base station 130 and the set of antennas 120 on the moving platform 110. In other words, when D is within a certain range, power efficiency and data rate of the wireless communication can be improved by selecting suitable pairs of antennas among the plurality of antennas 130a, 130b, 130c and 130d, being spaced apart by a suitable separation distance, and enabling the selected pair of antennas for wireless communication with the set of antennas 120 on the moving platform 110 (e.g., by concentrating power to the selected pair of antennas).

In at least one example configuration, a wireless communication range of base stations for high-speed railway is set at 1500 meters, e.g., between a base station and the mobile station on trains. When 2.4 GHz, for example, is adopted as the carrier frequency and 3G and/or 4G standards are implemented for high-speed railway wireless communication, a quantity of four of antennas (e.g., 130a, 130b, 130c and 130d) associated with the base station 130 and a quantity of two antennas on the roof of the moving platform 110 are sufficient to implement the proposed technique.

According to equation (5), when the moving platform 110 reaches the edge of the range of coverage by the base station 130, where D=1500 m, the maximum channel capacity is reached if $$s_1 s_2 = \frac{\lambda_c D}{2} = \frac{3 \times 10^8 \times 1500}{2 \times 2.4 \times 10^9} = 93.75 \text{ m}^2 \text{ is satisfied.}$$

In this case, the distance between the plurality of antennas 130a, 130b, 130c and 130d associated with the base station 130 and the set of antennas 120 of the moving platform 110 is far and the SNR of the receiving antennas is low. Since the distance between the two antennas on the top of the moving platform 110 is fixed (e.g., 3 meters or $s_2$=3 m), the channel matrix with full rank can be achieved via selecting a pair of antennas among the plurality of antennas 130a, 130b, 130c and 130d having a separation of 31.25 meters (i.e., $s_1$=31.25 m) therebetween. For example, as shown in FIG. 1, antennas 130a and 130d are selected and enabled for wireless communication at this point. Accordingly, throughput of wireless communication at the edge of the wireless communication cell associated with the base station 130 is effectively improved. Those skilled in the art would appreciate that, for illustrative purpose and not as limitations, certain numerical values are used in various examples in the present disclosure (e.g., 1500 m, 3 m, etc). Systems, apparatuses, method, and techniques in accordance with the present disclosure are not limited thereto and may be implemented in applications where pertinent numerical values differ from those used in the examples herein.

As the distance between the plurality of antennas 130a, 130b, 130c and 130d associated with the base station 130 and the set of antennas 120 of the moving platform 110 gradually decreases as the platform 110 moves towards the base station 130, it is difficult, if not impossible, to keep the channel in the full rank state. However, the same pair of antennas associated with the base station 130 continues to be utilized for communication with the set of antennas 120 of the moving platform 110.

Figure 3:
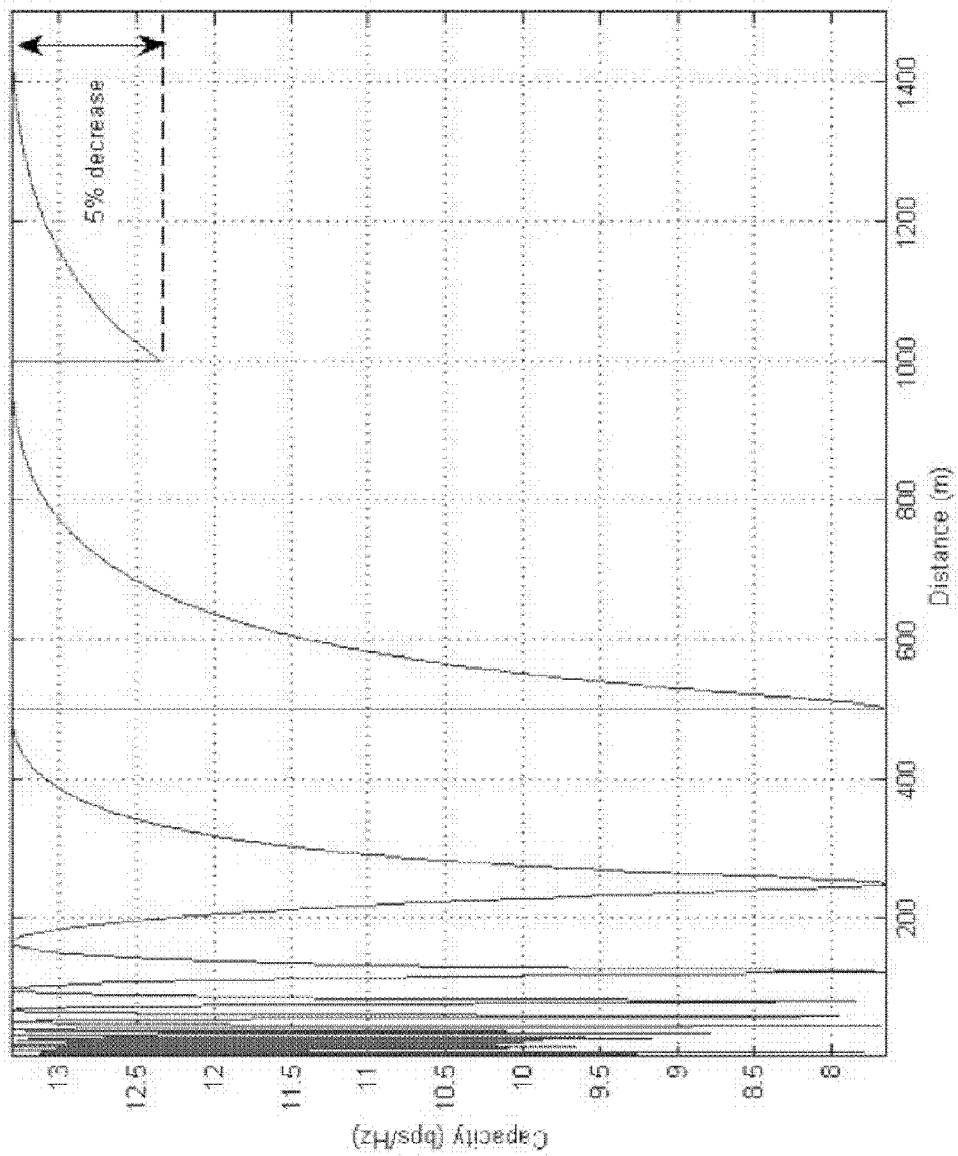
FIG. 3 shows a graph of channel capacity versus the distance between a base station and a mobile station on a moving platform.

FIG. 3 shows a graph of channel capacity versus the distance between a base station and a mobile station on a moving platform. As shown in FIG. 3, channel capacity decreases 7% as the distance between the antennas associated with a base station and a mobile station on a moving platform reduces at around 1500 m. The far field, i.e., 1000 m-1500 m, is important for wireless access on high-speed trains. Given that the SNR in this area is usually small and it requires high capacity gain from MIMO channel matrix to maintain reliable communication.

When the distance between the plurality of antennas 130a, 130b, 130c and 130d associated with the base station 130 and the set of antennas 120 of the moving platform 110 of the moving platform 110 reaches 1000 m, for example, then $s_1 s_2$=62.5 m² according to equation (5) can be satisfied. The channel matrix with full rank is achieved by selecting a pair of antennas among the plurality of antennas 130a, 130b, 130c and 130d having a separation of 20.84 m (i.e., $s_1$=20.84 m) therebetween as the distance between the two antennas on the top of the moving platform 110 is fixed (e.g., 3 meters or $s_2$=3 m).

When the distance between the plurality of antennas 130a, 130b, 130c and 130d associated with the base station 130 and the set of antennas 120 of the moving platform 110 reaches 500 m, for example, the maximum channel capacity is reached if $$s_1 s_2 = \frac{\lambda_c D}{2} = \frac{3 \times 10^8 \times 500}{2 \times 2.4 \times 10^9} = 31.25 \text{ m}^2 \text{ is satisfied.}$$

Similarly, in this case the channel matrix with full rank can be achieved by selecting a pair of antennas among the plurality of antennas 130a, 130b, 130c and 130d having a separation of 10.42 meters (i.e., $s_1$=10.42 m) therebetween as the distance between the two antennas on the top of the moving platform 110 is fixed (e.g., 3 meters or $s_2$=3 m). For example, as shown in FIG. 1, antennas 130b and 130c is selected and enabled for wireless communication at this point. Accordingly, throughput of wireless communication at the edge of the wireless communication cell associated with the base station 130 is effectively improved.

When the distance between the plurality of antennas 130a, 130b, 130c and 130d associated with the base station 130 and the set of antennas 120 of the moving platform 110 is less than a distance at which channel matrix with full rank is supported by a pair of antennas among the plurality of antennas 130a, 130b, 130c and 130d having a minimum separation therebetween (e.g., 500 m by pairing antennas 130b and 130c), it becomes difficult to maintain the MIMO channel in the full rank state since the optimal antenna separation changes rapidly while the receiving SNR increases. Accordingly, loss in channel capacity due to decreased rank is compensated by the increased SNR.

Compared with existing techniques, the proposed technique improves channel capacity with adaptive pairing of antennas on the base station side corresponding to the approximate distance between the base station 130 (and the plurality of antennas 130a, 130b, 130c and 130d associated therewith) and the moving platform 110 (and the set of antennas 120 thereof). Furthermore, as it may be difficult to feedback instantaneous channel state information (CSI) to the transmitting antennas in time due to the rapid change of the channel caused by the high-speed movement of the moving platform 110, substantially equal power may be allocated to the selected pair of antennas to enable the selected pair of antennas.

Exemplary Processes

Figure 4:
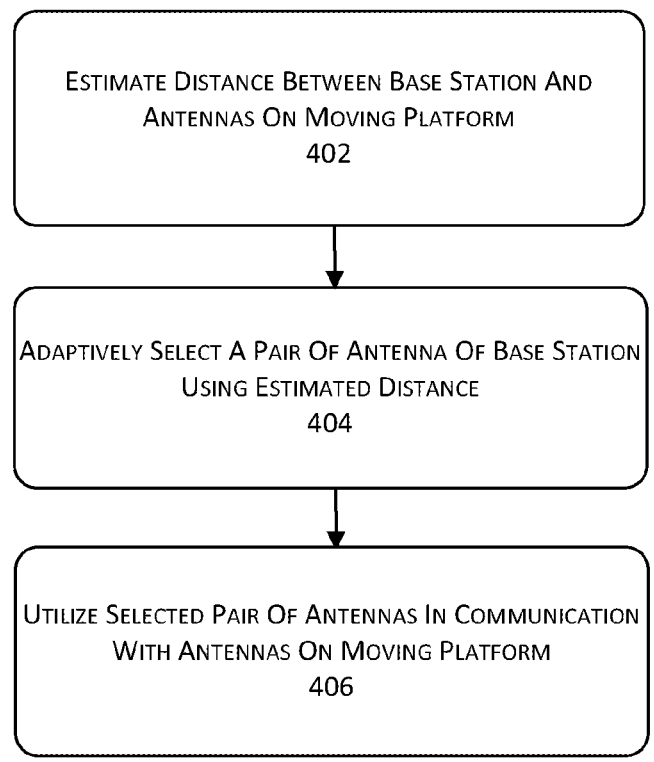
FIG. 4 shows a processing flow in accordance with one or more embodiments of a self-adapted multi-antenna selection method for broadband wireless access for a moving platform, arranged in accordance with embodiments described herein.

FIG. 4 shows a processing flow 400 in accordance with one or more embodiments of a self-adapted multi-antenna selection method for broadband wireless access for a moving platform, arranged in accordance with embodiments described herein.

Example processing flow 400 includes one or more operations, actions, or functions as illustrated by one or more of blocks 402, 404 and 406. Although illustrated as discrete blocks, various blocks may be divided into additional blocks, combined into fewer blocks, or eliminated, depending on the desired implementation. Further, processing flow 400 may be implemented in the base station 130, a central office associated with the base station 130, and/or an example computing device 700, to be described below. Processing flow 400 may begin at block 402.

Block 402 (Estimate Distance Between Base Station And Antennas On Moving Platform) includes estimating an approximate distance between a base station and a set of antennas on a moving platform that travels through an area within a wireless communication range of the base station. For example, a location of the moving platform 110 is first estimated using a global positioning system (GPS)-based tracking system and/or a railway track circuit associated with a railway on which the moving platform 110 travels. The estimated location of the moving platform 110 is then transmitted to a computing device associated with the base station 130 to calculate the approximate distance between the base station 130 (and the plurality of antennas 130a, 130b, 130c and 130d) and the moving platform 110 (and the set of antennas 120). Processing proceeds from block 402 to block 404.

Block 404 (Adaptively Select A Pair Of Antennas Of Base Station Using Estimated Distance) includes adaptively selecting a pair of antennas from a plurality of antennas associated with the base station based at the estimated approximate distance between the base station and the set of antennas on the moving platform. For example, the base station 130, or a computing device controlling operations of the base station 130, adaptively selects a pair of antennas (e.g., suitable two of the antennas 130a, 130b, 130c and 130d) based at the estimated approximate distance. Processing proceeds from block 404 to block 406.

Block 406 (Utilize Selected Pair Of Antennas In Communication With Antennas On Moving Platform) includes utilizing the selected pair of antennas in wireless communication with the set of antennas on the moving platform. For example, the base station 130, or a computing device controlling operations of the base station 130, enables and utilizes the selected pair of antennas to wirelessly communicate with the set of antennas 120 on the moving platform 110.

In at least some embodiments, adaptively selecting a pair of antennas from a plurality of antennas associated with the base station comprises selecting a pair of antennas that are spaced apart by a respective separation corresponding to the estimated approximate distance between the base station and the set of antennas on the moving platform.

In at least some embodiments, adaptively selecting a pair of antennas from the plurality of antennas comprises: (1) selecting a first antenna and a second antenna from the plurality of antennas associated with the base station for wireless communication for the set of antennas on the moving platform when the estimated approximate distance between the base station and the set of antennas on the moving platform is a first predefined distance; and (2) selecting a third antenna and a fourth antenna from the plurality of antennas associated with the base station for wireless communication for the set of antennas on the moving platform when the estimated approximate distance between the base station and the set of antennas on the moving platform is a second predefined distance. Here, the first antenna and the second antenna are spaced apart by a first separation; the third antenna and the fourth antenna are spaced apart by a second separation; the second predefined distance is less than the first predefined distance; and the second separation is less than the first separation.

In at least some embodiments, the first antenna, the second antenna, the third antenna, and the fourth antenna comprise three or more different antennas of the plurality of antennas associated with the base station. Referring to the above example, three antennas (130a, 130c and 130d or 130a, 130b and 130d) are sufficient to provide wireless communication when the moving platform 110 is in the range of 1000 m-1500 m and the range of 500 m-1000 m away from the base station 130.

In at least some embodiments, processing flow 400 further comprises selecting a fifth antenna and a sixth antenna from the plurality of antennas associated with the base station for wireless communication for the set of antennas on the moving platform when the estimated approximate distance between the base station and the set of antennas on the moving platform is a third predefined distance. Here, the fifth antenna and the sixth antenna are spaced apart by a third separation; the third predefined distance is less than the second predefined distance; and the third separation is less than the second separation.

In at least some embodiment, the first antenna, the second antenna, the third antenna, the fourth antenna, the fifth antenna, and the sixth antenna comprise four or more different antennas of the plurality of antennas associated with the base station. Referring to the above example, four antennas (130a, 130b, 130c and 130d) are sufficient to provide wireless communication when the moving platform 110 is in the range of 1000 m-1500 m, the range of 500 m-1000 m away from the base station 130, and the range of 0-500 m.

In at least some embodiments, the utilizing the selected pair of antennas in wireless communication with the set of antennas on the moving platform comprises allocating substantially equal power to the selected pair of antennas in transmitting signals to the set of antennas on the moving platform. For example, the base station 130, or a computing device controlling operations of the base station 130, allocates substantially equal power to each pair of the selected pairs of antennas in transmitting signals to the set of antennas 120 on the moving platform 110.

In at least some embodiments, the estimating the approximate distance between the base station and the set of antennae on the moving platform are based at least in part on a satellite-based positioning system or a railway track circuit associated with a railway on which the moving platform travels, or both. For example, the approximate distance is estimated using information from a GPS system and/or a railway track circuit associated with a railway on which the moving platform 110 travels.

For illustrative purpose, an example with respect to FIG. 4 is provided herein. In this example, referring to FIG. 1, antennas 130a and 130d are spaced apart by a separation of 31.25 m, antennas 130a and 130c are spaced apart by a separation of 20.82 m, antennas 130b and 130d are spaced apart by a separation of 20.82 m, and antennas 130b and 130c are spaced apart by a separation of 10.42 m. In this example, antennas 130a and 130d are selected and utilized when the estimated approximate distance is 1500 m, at which the moving platform 110 reaches the edge of a wireless communication cell associated with base station 130. Antennas 130a and 130c, or antennas 130b and 130d, are selected and utilized when the estimated approximate distance is 1000 m. Antennas 130b and 130c are selected and utilized when the estimated approximate distance is 500 m.

Figure 5:
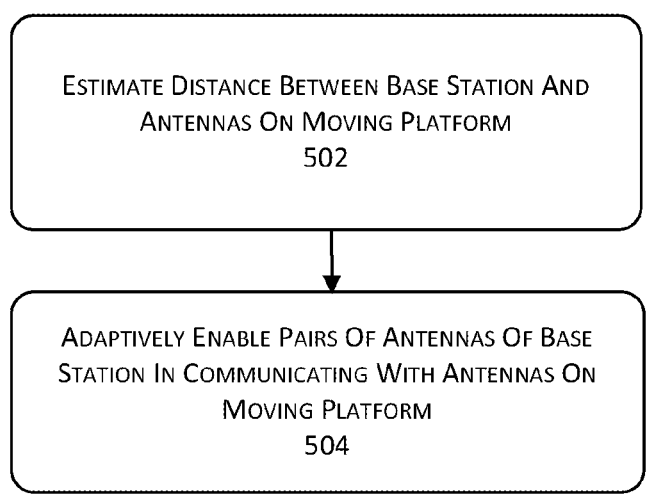
FIG. 5 shows another processing flow in accordance with one or more embodiments of a self-adapted multi-antenna selection method for broadband wireless access for a moving platform, arranged in accordance with embodiments described herein.

FIG. 5 shows a processing flow 500 in accordance with one or more embodiments of a self-adapted multi-antenna selection method for broadband wireless access for a moving platform, arranged in accordance with embodiments described herein.

Example processing flow 500 includes one or more operations, actions, or functions as illustrated by one or more of blocks 502 and 504. Although illustrated as discrete blocks, various blocks may be divided into additional blocks, combined into fewer blocks, or eliminated, depending on the desired implementation. Further, processing flow 500 may be implemented in the base station 130, a central office associated with the base station 130, and/or an example computing device 700, to be described below. Processing flow 500 may begin at block 502.

Block 502 (Estimate Distance Between Base Station And Antennas On Moving Platform) includes estimating an approximate distance between a base station and a set of antennas on a moving platform that travels through an area within a wireless communication range of the base station. For example, a location of the moving platform 110 is first estimated using a global positioning system (GPS)-based tracking system and/or a railway track circuit associated with a railway on which the moving platform 110 travels. The estimated location of the moving platform 110 is then transmitted to a computing device associated with the base station 130 to calculate the approximate distance between the base station 130 (and the plurality of antennas 130a, 130b, 130c and 130d) and the moving platform 110 (and the set of antennas 120). Processing proceeds from block 502 to block 504.

Block 504 (Adaptively Enable Pairs Of Antennas Of Base Station In Communication With Antennas On Moving Platform) includes adaptively enabling at least two different pairs of antennas of a plurality of separately located antennas associated with the base station to wirelessly communicate with the set of antennas on the moving platform when the moving platform is within the wireless communication range of the base station such that each pair of the at least two different pairs of antennas is enabled at a respective time based on the estimated approximate distance between the base station and the set of antennas on the moving platform at the respective time.

In at least some embodiments, adaptively enabling at least two different pairs of antennas from a plurality of separately located antennas associated with the base station comprises: (1) enabling a first pair of antennas of the separately located plurality of antennas at a first point in time to wirelessly communicate with the set of antennas on the moving platform when the estimated approximate distance at the first point in time between the base station and the set of antennas on the moving platform is a first distance; and (2) enabling a second pair of antennas of the plurality of separately located antennas at a second point in time after the first point in time to wirelessly communicate with the set of antennas on the moving platform when the estimated approximate distance at the second point in time between the base station and the set of antennas on the moving platform is a second distance that is different from the first distance.

In at least some embodiments, the first pair of antennas and the second pair of antennas comprise three or four different antennas of the plurality of separately located antennas associated with the base station.

In at least some embodiments, the processor allocates substantially equal power to both antennas of a pair of antennas of the at least two different pairs of antennas when enabling the pair of antennas of the at least two different pairs of antennas. For example, the base station 130, or a computing device controlling operations of the base station 130, allocates substantially equal power to each pair of the selected pairs of antennas in transmitting signals to the set of antennas 120 on the moving platform 110.

In at least some embodiments, the processor estimates the approximate distance between a base station and a set of antennas on a moving platform based at least in part on information from a satellite-based positioning system or a railway track circuit associated with a railway on which the moving platform travels, or both. For example, the approximate distance is estimated using information from a GPS system and/or a railway track circuit associated with a railway on which the moving platform 110 travels.

For illustrative purpose, an example with respect to FIG. 5 is provided herein. In this example, referring to FIG. 1, antennas 130a and 130d are spaced apart by a separation of 31.25 m, antennas 130a and 130c are spaced apart by a separation of 20.82 m, antennas 130b and 130d are spaced apart by a separation of 20.82 m, and antennas 130b and 130c are spaced apart by a separation of 10.42 m. In this example, antennas 130a and 130d are enabled and utilized when the estimated approximate distance is 1500 m, at which the moving platform 110 reaches the edge of a wireless communication cell associated with base station 130. Antennas 130a and 130c, or antennas 130b and 130d, are enabled and utilized when the estimated approximate distance is 1000 m. Antennas 130b and 130c are enabled and utilized when the estimated approximate distance is 500 m.

Figure 6:
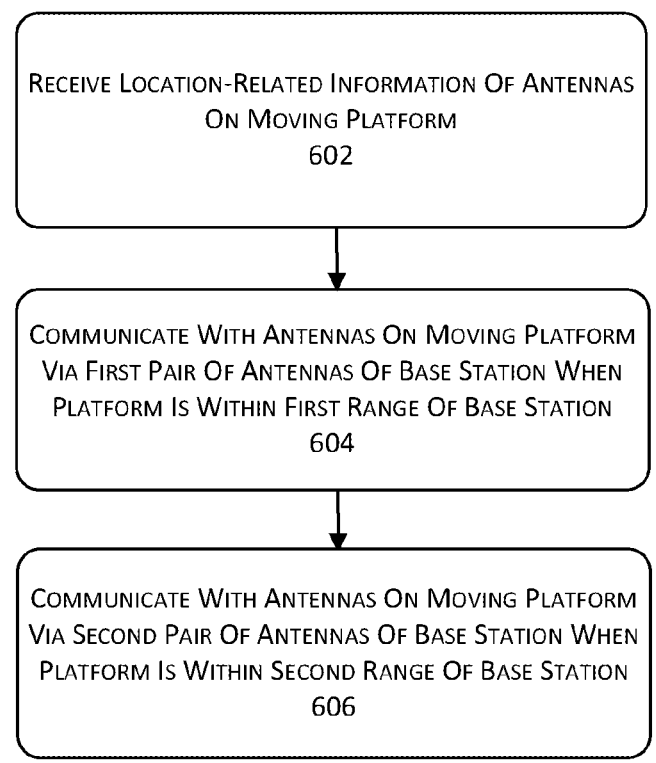
FIG. 6 shows yet another processing flow in accordance with one or more embodiments of a self-adapted multi-antenna selection method for broadband wireless access for a moving platform, arranged in accordance with embodiments described herein.

FIG. 6 shows a processing flow 600 in accordance with one or more embodiments of a self-adapted multi-antenna selection method for broadband wireless access for a moving platform, arranged in accordance with embodiments described herein.

Example processing flow 600 includes one or more operations, actions, or functions as illustrated by one or more of blocks 602, 604 and 606. Although illustrated as discrete blocks, various blocks may be divided into additional blocks, combined into fewer blocks, or eliminated, depending on the desired implementation. Further, processing flow 600 may be implemented in the base station 130, a central office associated with the base station 130, and/or an example computing device 700, to be described below. Processing flow 600 may begin at block 602.

Block 602 (Receive Location-Related Information Of Antennas On Moving Platform) includes receiving location-related information of a set of antennas on a moving platform that travels through an area within a wireless communication range of a base station. For example, the base station 130, or a computing device associated with the base station 130, receives information related to location of the moving platform 110 (and the set of antennas 120 on the moving platform 110) from a global positioning system (GPS)-based tracking system and/or a railway track circuit associated with a railway on which the moving platform 110 travels. Processing proceeds from block 602 to block 604.

Block 604 (Communicate With Antennas On Moving Platform Via First Pair Of Antennas Of Base Station When Platform Is Within First Range Of Base Station) includes enabling the base station to wirelessly communicate with the set of antennas on the moving platform via a first pair of antennas of a plurality of antennas associated with the base station when the location-related information indicates the set of antennas on the moving platform are within a first range of the base station. Processing proceeds from block 604 to block 606.

Block 606 (Communicate With Antennas On Moving Platform Via Second Pair Of Antennas Of Base Station When Platform Is Within Second Range Of Base Station) includes enabling the base station to wirelessly communicate with the set of antennas on the moving platform via a second pair of antennas of the plurality of antennas associated with the base station when the location-related information indicates the set of antennas on the moving platform are within a second range of the base station. Here, a separation between the two antennas of the first pair of antennas and a separation between the two antennas of the second pair of antennas are different, and the first range and the second range are different.

In at least some embodiments, the separation between the two antennas of the first pair of antennas is greater than the separation between the two antennas of the second pair of antennas, and the first range is greater than the second range.

In at least some embodiments, the first pair of antennas and the second pair of antennas comprise three or four antennas of the plurality of antennas associated with the base station. For example, three antennas (130a, 130c and 130d or 130a, 130b and 130d) are sufficient to provide wireless communication when the moving platform 110 is in the range of 1000 m-1500 m and the range of 500 m-1000 m away from the base station 130.

In at least some embodiments, the enabling comprises allocating substantially equal power to antennas of the first pair of antennas and the second pair of antennas to transmit signals to the set of antennas on the moving platform. For example, the base station 130, or a computing device controlling operations of the base station 130, allocates substantially equal power to each pair of the selected pairs of antennas in transmitting signals to the set of antennas 120 on the moving platform 110.

In at least some embodiments, the receiving the location-related information comprises receiving the location-related information from a satellite-based positioning system or a railway track circuit associated with a railway on which the moving platform travels, or both. For example, the approximate distance is estimated using information from a GPS system and/or a railway track circuit associated with a railway on which the moving platform 110 travels.

For illustrative purpose, an example with respect to FIG. 6 is provided herein. In this example, referring to FIG. 1, antennas 130a and 130d are spaced apart by a separation of 31.25 m, antennas 130a and 130c are spaced apart by a separation of 20.82 m, antennas 130b and 130d are spaced apart by a separation of 20.82 m, and antennas 130b and 130c are spaced apart by a separation of 10.42 m. In this example, antennas 130a and 130d are enabled and utilized when the estimated approximate distance is 1500 m, at which the moving platform 110 reaches the edge of a wireless communication cell associated with base station 130. Antennas 130a and 130c, or antennas 130b and 130d, are enabled and utilized when the estimated approximate distance is 1000 m. Antennas 130b and 130c are enabled and utilized when the estimated approximate distance is 500 m.

Embodiments of the proposed technique can achieve improved channel capacity with a channel matrix with full rank by adaptively pairing antennas or a plurality of antennas associated with the base station to wireless communicate with the set of antennas on the moving platform via the selected pair of antennas. The pairing of antennas change as the distance between the moving platform and the base station varies, e.g., decreases, as the moving platform continues its motion. The selected pairs of antennas are enabled with substantially equal power, thereby simplifying the control of the operations of the base station.

Exemplary Computing Device

Figure 7:
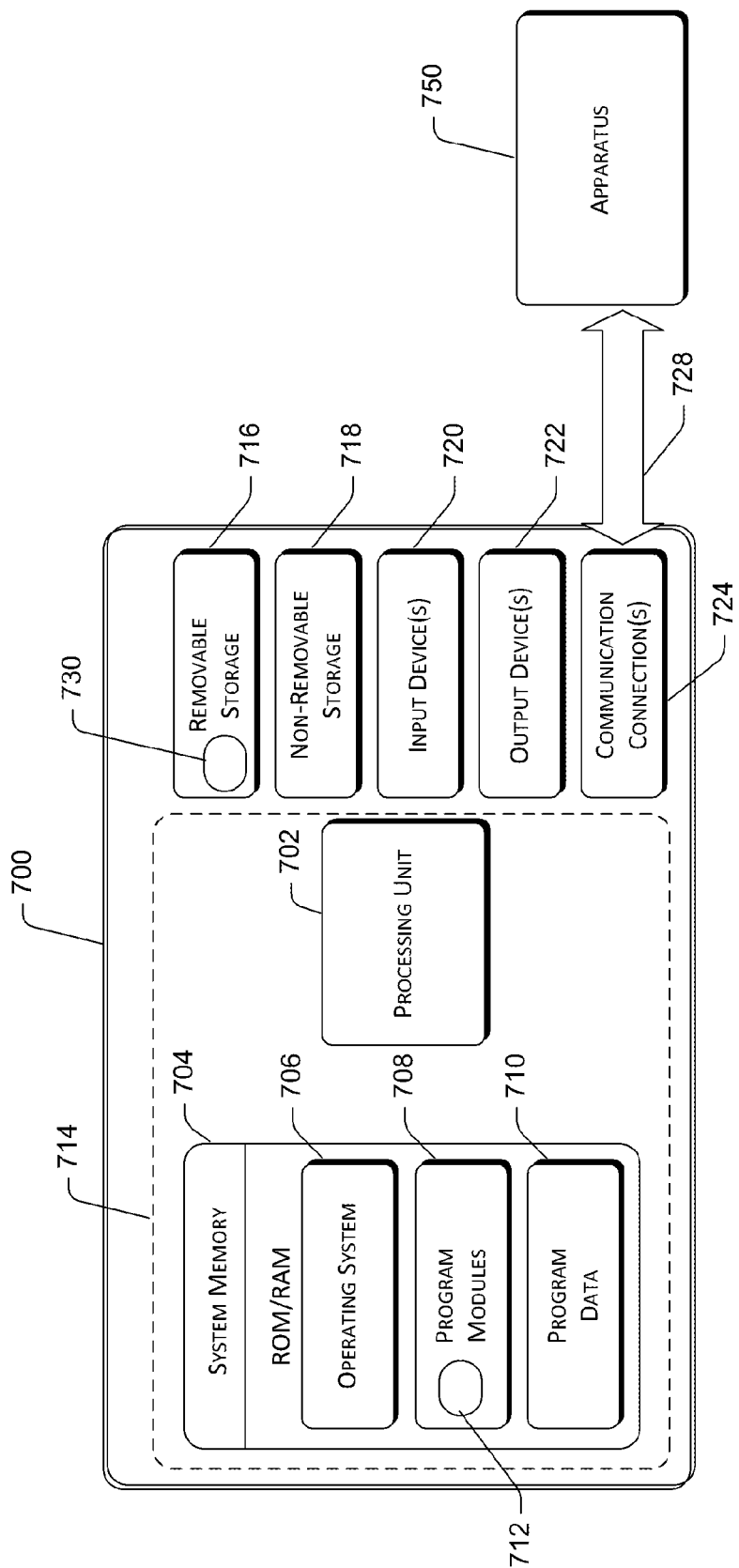
FIG. 7 shows an example computing device that is configured to implement operations of one or more embodiments of self-adapted multi-antenna selection for broadband wireless access for a moving platform, arranged in accordance with embodiments described herein.

FIG. 7 shows an example computing device 700 that is configured to implement operations of one or more embodiments of self-adapted multi-antenna selection for broadband wireless access for a moving platform.

It will be readily appreciated that the techniques disclosed herein may be implemented in other computing devices, systems, and environments. The computing device 700 shown in FIG. 7 is one example of a computing device and not intended to suggest any limitation as to the scope of use or functionality of the computer and network architectures.

In at least one implementation, computing device 700 typically includes at least one processing unit 702 and system memory 704. Depending on the exact configuration and type of computing device, system memory 704 may be volatile (such as RAM), non-volatile (such as ROM, flash memory, etc.) or some combination thereof. System memory 704 may include an operating system 706, one or more program modules 708, and may include program data 710. A basic implementation of the computing device 700 is demarcated by a dashed line 714. In at least one embodiment, computing device 700 may be a part of the base station 130 and/or a central office associated with the base station 130 and any one or more other base stations. In at least another embodiment, computing device 700 may be a computing device that is communicatively coupled to the base station 130 and/or a central office associated with the base station 130 and any one or more other base stations.

The program module 708 may include a module 712 configured to implement the self-adapted multi-antenna selection technique as described above. For example, the module 712 include a set of computer-executable instructions or program codes that, when executed by the processing unit 702, may cause the processing unit 702 to carry out processing flows 400, 500 and/or 600, and any variations thereof, e.g., the computing device 700 performing the operations as described above with respect to processing flows 400, 500 and/or 600.

Computing device 700 may have additional features or functionality. For example, computing device 700 may also include additional data storage devices such as removable storage 716 and non-removable storage 718. In at least some implementations, the removable storage 716 and non-removable storage 718 are an example of computer accessible media for storing computer-executable instructions or program codes that are executable by the processing unit 702 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 700. Any of such computer accessible media may be part of the computing device 700.

In one implementation, the removable storage 716, which is a computer accessible medium, has a set of computer-executable instructions 730 stored thereon. When executed by the processing unit 702, the set of computer-executable instructions 730 cause the processing unit 702 to execute operations, tasks, functions and/or methods as described above, including processing flows 300, 400 and/or 500 and any variations thereof.

Computing device 700 may also include one or more input devices 720 such as keyboard, mouse, pen, voice input device, touch input device, etc. Computing device 700 may additionally include one or more output devices 722 such as a display, speakers, printer, etc.

Computing device 700 may also include one or more communication connections 724 that allow the computing device 700 to communicate with apparatus 750 over network connection 728. Apparatus 750 may be the base station 130 or a central office associated with the base station 130 and any one or more other base stations. In such case, computing device 700 may be a computing device used by an operator to control operations of the base station 130 or a central office associated with the base station 130 and any one or more other base stations.

Upon executing the set of computer-executable instructions, whether stored in module 712 of program module 708 or in removable storage 716, processing unit 702 may direct computing device 700 or apparatus 750 to carry out a number of operations to implement the self-adapted multi-antenna selection technique as described above, including processing flows 300, 400 and/or 500 and any variations thereof.

It is appreciated that the illustrated computing device 700 is one example of a suitable device and is not intended to suggest any limitation as to the scope of use or functionality of the various embodiments described.

Additional and Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

We claim:

1. A method, comprising:
   estimating an approximate distance between a base station and a set of antennas on a moving platform that travels through an area within a wireless communication range of the base station;
   adaptively selecting a pair of antennas from a plurality of antennas associated with the base station and spaced apart by a respective separation corresponding to the estimated approximate distance between the base station and the set of antennas on the moving platform; and
   utilizing the selected pair of antennas in wireless communication with the set of antennas on the moving platform.

2. The method of claim 1, wherein the adaptively selecting a pair of antennas from the plurality of antennas comprises:
   selecting a first antenna and a second antenna from the plurality of antennas associated with the base station for wireless communication for the set of antennas on the moving platform when the estimated approximate distance between the base station and the set of antennas on the moving platform is a first predefined distance; and
   selecting a third antenna and a fourth antenna from the plurality of antennas associated with the base station for wireless communication for the set of antennas on the moving platform when the estimated approximate distance between the base station and the set of antennas on the moving platform is a second predefined distance,
   wherein:
      the first antenna and the second antenna are spaced apart by a first separation;
      the third antenna and the fourth antenna are spaced apart by a second separation;
      the second predefined distance is less than the first predefined distance; and
      the second separation is less than the first separation.

3. The method of claim 2, wherein the first antenna, the second antenna, the third antenna, and the fourth antenna comprise three or more different antennas of the plurality of antennas associated with the base station.

4. The method of claim 2, further comprising:
   selecting a fifth antenna and a sixth antenna from the plurality of antennas associated with the base station for wireless communication for the set of antennas on the moving platform when the estimated approximate distance between the base station and the set of antennas on the moving platform is a third predefined distance,
   wherein:
      the fifth antenna and the sixth antenna are spaced apart by a third separation;
      the third predefined distance is less than the second predefined distance; and
      the third separation is less than the second separation.

5. The method of claim 4, wherein the first antenna, the second antenna, the third antenna, the fourth antenna, the fifth antenna, and the sixth antenna comprise four or more different antennas of the plurality of antennas associated with the base station.

6. The method of claim 1, wherein the utilizing the selected pair of antennas in wireless communication with the set of antennas on the moving platform comprises allocating substantially equal power to the selected pair of antennas in transmitting signals to the set of antennas on the moving platform.

7. The method of claim 1, wherein the estimated approximate distance between the base station and the set of antennae on the moving platform is based at least in part on a satellite-based positioning system or a railway track circuit associated with a railway on which the moving platform travels, or both.

8. An apparatus, comprising:
   a memory in which a set of processor-executable instructions is stored; and
   a processor coupled to the memory and configured to execute the set of processor-executable instructions such that, upon executing the set of processor-executable instructions, the processor performs operations comprising:
      estimating an approximate distance between a base station and a set of antennas on a moving platform that travels through an area within a wireless communication range of the base station; and
      adaptively enabling at least two different pairs of antennas of a plurality of separately located antennas associated with the base station to wirelessly communicate with the set of antennas on the moving platform when the moving platform is within the wireless communication range of the base station such that each pair of the at least two different pairs of antennas is enabled at a respective time based on the estimated approximate distance between the base station and the set of antennas on the moving platform at the respective time.

9. The apparatus of claim 8, wherein the adaptively enabling at least two different pairs of antennas from a plurality of separately located antennas associated with the base station comprises:
   enabling a first pair of antennas of the separately located plurality of antennas at a first point in time to wirelessly communicate with the set of antennas on the moving platform when the estimated approximate distance at the first point in time between the base station and the set of antennas on the moving platform is a first distance; and
   enabling a second pair of antennas of the plurality of separately located antennas at a second point in time after the first point in time to wirelessly communicate with the set of antennas on the moving platform when the estimated approximate distance at the second point in time between the base station and the set of antennas on the moving platform is a second distance that is different from the first distance.

10. The apparatus of claim 9, wherein the first pair of antennas and the second pair of antennas comprise three or four different antennas of the plurality of separately located antennas associated with the base station.

11. The apparatus of claim 8, wherein the processor allocates substantially equal power to both antennas of a pair of antennas of the at least two different pairs of antennas when enabling the pair of antennas of the at least two different pairs of antennas.

12. The apparatus of claim 8, wherein the processor estimates the approximate distance between a base station and a set of antennas on a moving platform based at least in part on information from a satellite-based positioning system or a railway track circuit associated with a railway on which the moving platform travels, or both.

13. A non-transitory computer-readable medium storing instructions that, when executed, cause one or more processors to perform operations comprising:
   receiving location-related information of a set of antennas on a moving platform that travels through an area within a wireless communication range of a base station;
   enabling the base station to wirelessly communicate with the set of antennas on the moving platform via a first pair of antennas of a plurality of antennas associated with the base station when the location-related information indicates the set of antennas on the moving platform are within a first range of the base station; and enabling the base station to wirelessly communicate with the set of antennas on the moving platform via a second pair of antennas of the plurality of antennas associated with the base station when the location-related information indicates the set of antennas on the moving platform are within a second range of the base station, wherein:
- a separation between the two antennas of the first pair of antennas and a separation between the two antennas of the second pair of antennas are different, and
- the first range and the second range are different.

14. The non-transitory computer-readable medium of claim 13, wherein the separation between the two antennas of the first pair of antennas is greater than the separation between the two antennas of the second pair of antennas, and wherein the first range is greater than the second range.

15. The non-transitory computer-readable medium of claim 13, wherein the first pair of antennas and the second pair of antennas comprise three or four antennas of the plurality of antennas associated with the base station.

16. The non-transitory computer-readable medium of claim 13, wherein the enabling comprises allocating substantially equal power to antennas of the first pair of antennas and the second pair of antennas to transmit signals to the set of antennas on the moving platform.

17. The non-transitory computer-readable medium of claim 13, wherein the receiving the location-related information comprises receiving the location-related information from a satellite-based positioning system or a railway track circuit associated with a railway on which the moving platform travels, or both.

18. A wireless communication system, comprising:
- a base station that engages in wireless communication with a set of antennas on a moving platform that travels through an area within a wireless communication range of the base station, the base station comprising:
  - a plurality of antennas that are spaced apart from each other, and
  - a computing device including:
    - memory in which a set of processor-executable instructions is stored, and
    - a processor coupled to the memory and operable to execute the set of processor-executable instructions such that, upon executing the set of processor-executable instructions, the processor performs operations comprising:
      - receiving location-related information regarding the set of antennas on the moving platform,
      - enabling the base station to wirelessly communicate with the set of antennas on the moving platform via a first pair of antennas of the plurality of antennas of the base station when the location-related information indicates the set of antennas on the moving platform are within a first range of the base station, and
      - enabling the base station to wirelessly communicate with the set of antennas on the moving platform via a second pair of antennas of the plurality of antennas of the base station when the location-related information indicates the set of antennas on the moving platform being within a second range of the base station, wherein:
a separation between the two antennas of the first pair of antennas and a separation between the two antennas of the second pair of antennas are different, and the first range and the second range are different.

19. The wireless communication system of claim 18, wherein the separation between the two antennas of the first pair of antennas is greater than the separation between the two antennas of the second pair of antennas, and wherein the first range is greater than the second range.

20. The wireless communication system of claim 18, wherein the first pair of antennas and the second pair of antennas comprise three or four antennas of the plurality of antennas associated with the base station.

21. The wireless communication system of claim 18, wherein the processor allocates substantially equal power to antennas of the first pair of antennas and the second pair of antennas to transmit signals to the set of antennas on the moving platform.

22. The wireless communication system of claim 18, wherein the processor receives the location-related information from a satellite-based positioning system or a railway track circuit associated with a railway on which the moving platform travels, or both.

* * * * *